United States Patent
Lester et al.

(10) Patent No.: US 7,317,550 B2
(45) Date of Patent: Jan. 8, 2008

(54) PRINTING UTILIZING EXTERNAL STORAGE

(75) Inventors: Samuel M. Lester, Boise, ID (US); Jimmy Sfaelos, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 956 days.

(21) Appl. No.: 10/137,395

(22) Filed: May 3, 2002

(65) Prior Publication Data

US 2003/0206315 A1    Nov. 6, 2003

(51) Int. Cl.
*G06F 15/00* (2006.01)

(52) U.S. Cl. ............... 358/1.16; 358/1.15; 358/1.17; 709/203; 709/218; 709/219

(58) Field of Classification Search ...... 358/1.15–1.17, 358/404, 444; 709/203, 217, 218, 219
See application file for complete search history.

(56) References Cited

U.S. PATENT DOCUMENTS

| | | | |
|---|---|---|---|
| 5,371,873 A * | 12/1994 | Niwa | 710/20 |
| 5,764,863 A | 6/1998 | Fall et al. | 395/112 |
| 5,923,013 A * | 7/1999 | Suzuki et al. | 235/375 |
| 6,067,168 A * | 5/2000 | Nishiyama et al. | 358/1.16 |
| 6,078,403 A * | 6/2000 | Palmer | 358/1.18 |
| 6,160,629 A * | 12/2000 | Tang et al. | 358/1.1 |
| 6,351,318 B1 * | 2/2002 | Gunning et al. | 358/1.16 |
| 6,449,053 B2 * | 9/2002 | Bando | 358/1.15 |
| 6,591,336 B2 * | 7/2003 | Kubo | 711/113 |
| 6,623,190 B1 * | 9/2003 | Lutz | 400/76 |
| 6,734,872 B1 * | 5/2004 | Varga et al. | 345/629 |
| 6,924,906 B1 * | 8/2005 | Schwier et al. | 358/1.6 |
| 6,954,278 B1 * | 10/2005 | Cronch et al. | 358/1.15 |
| 7,023,568 B2 * | 4/2006 | Tsunekawa | 358/1.13 |
| 7,042,587 B2 * | 5/2006 | Fiske | 358/1.15 |
| 7,189,016 B2 * | 3/2007 | Leslie et al. | 400/76 |
| 2002/0120792 A1 * | 8/2002 | Blair et al. | 709/330 |
| 2003/0120740 A1 * | 6/2003 | Beeman et al. | 709/213 |

* cited by examiner

*Primary Examiner*—Douglas Q. Tran
*Assistant Examiner*—Chan S. Park

(57) ABSTRACT

A method of printing including the steps of receiving a print job having image data, converting the image data into raster bits, and transmitting the raster bits to an external file storage.

24 Claims, 4 Drawing Sheets

PRINTING UTILIZING EXTERNAL STORAGE

Reference is made to the U.S. patent application Ser. No. 10/017,594-1 entitled "PRINT JOB STORAGE" by Todd Lutz (different inventive entity), now U.S. patent No. 6,623,190, which is assigned to the assignee of the present invention and filed as of the same date as the present application.

FIELD OF THE INVENTION

This invention relates generally to printers, and more particularly to a method and system for printing utilizing external storage.

BACKGROUND OF THE INVENTION

There are many electronic devices capable of generating data that needs to be printed in document form. Devices such as computers, facsimile machines, digital cameras and copiers, medical imaging devices, optical scanners, satellite imaging devices, and scientific data collection devices, etc., typically employ a single processor to perform the various data collection, organization and print request functions. Unfortunately, when the processor is busy processing a print request, it is unavailable for other tasks. This problem occurs, for example, when the user of a personal computer requests multiple copies of a single document and then has to wait until the computer completes multiple print requests before he or she can again use the computer.

This problem has been addressed in systems that utilize background printing, i.e., printing which attempts to make the computer more available by processing print requests only during idle times for the processor. In this instance, a multi-page collated document printed "n" number of times would significantly slow down foreground processing of the user's document. Additionally, when the print job is sent repeatedly over a computer network to the printer, the response time of the computer network can be noticeably affected.

The problems associated with requesting multiple copies of a document in a printed job were largely solved through the introduction of Mopier® printers by HEWLETT PACKARD™. The operational features of the Mopier®, which are described in U.S. Pat. No. 5,764,863 entitled Multiple Original Copy Data Printer, provide a way to print multiple copies from a single transmission of only one copy of the document to decrease the use of network resources, computing time and storage space necessary for printing multiple copies or "mopies." The term "mopy" stands for multiple original prints. A "mopy" is a reproduction of an original print that is bounded within a single job that a user sends to print. The original can be in either physical or electronic form, and the print job can be composed of "n" mopies. Each mopy may have "x" number of sheets. Both n and x may be one or more mopies and sheets, respectively.

However, one drawback is that without an on-board file system, the printer or other image-generating device cannot perform mopying functions. Many multiple original print (mopy) printers require a storage medium file system in order to properly perform the electronic collation functions. Many laser jet printers for instance, have flash devices that simulate a file system, or an actual EIO disk drive that is pluggable into the printer. If no on-board file system is available for mopying, the printer may default to non-collated copies. For example, a host computer may send a job requiring five copies of a three-page job. Because the printer does not carry an on-board file system, mopying is not possible. To compensate for this deficiency, the printer may convert the first image, page 1, into raster bits that are stored in a local RAM memory, which is subsequently printed five times. The printer may then drop the bits of the page 1 image, and convert page 2 into raster bits. Page 2 is then stored in the local RAM memory, and subsequently printed five times. The printer may then drop these page 2 bits and repeat the process for page 3. Alternatively, the printer may generate an error and not even attempt to print the job.

SUMMARY OF THE INVENTION

According to one embodiment, the invention pertains to a method for printing. The method includes the step of receiving a print job having image data and print command data. The method further includes the steps of converting the image data into raster bits and transmitting the raster bits to an external file storage.

According to another embodiment, the invention pertains to a network printing system. The system includes a host device of a plurality of host devices. The host device generates a print job, and the print job includes image data and data representative of print commands. In this respect, the printer includes image processing software for performing print commands, including the converting of the image data into a rasterized file. The printing system also includes a file storage external to the printer for storing the rasterized file created by the image processing software. The system also includes a network connection for transmitting the print job between the printer and the host device, and for transmitting the rasterized files between the printer and the file storage.

According to another embodiment, the invention pertains to a printing system. The printing system includes printing means for receiving a print job. The printing means includes means for rasterizing image data associated with the print job. The system further includes file storage means for storing the rasterized image data, with the file storage means being located external to the printing means.

BRIEF DESCRIPTION OF THE DRAWINGS

The present invention is illustrated by way of example and not limitation in the accompanying figures in which like numeral references refer to like elements, and wherein.

DETAILED DESCRIPTION OF A PREFERRED EMBODIMENT

Figure 1:
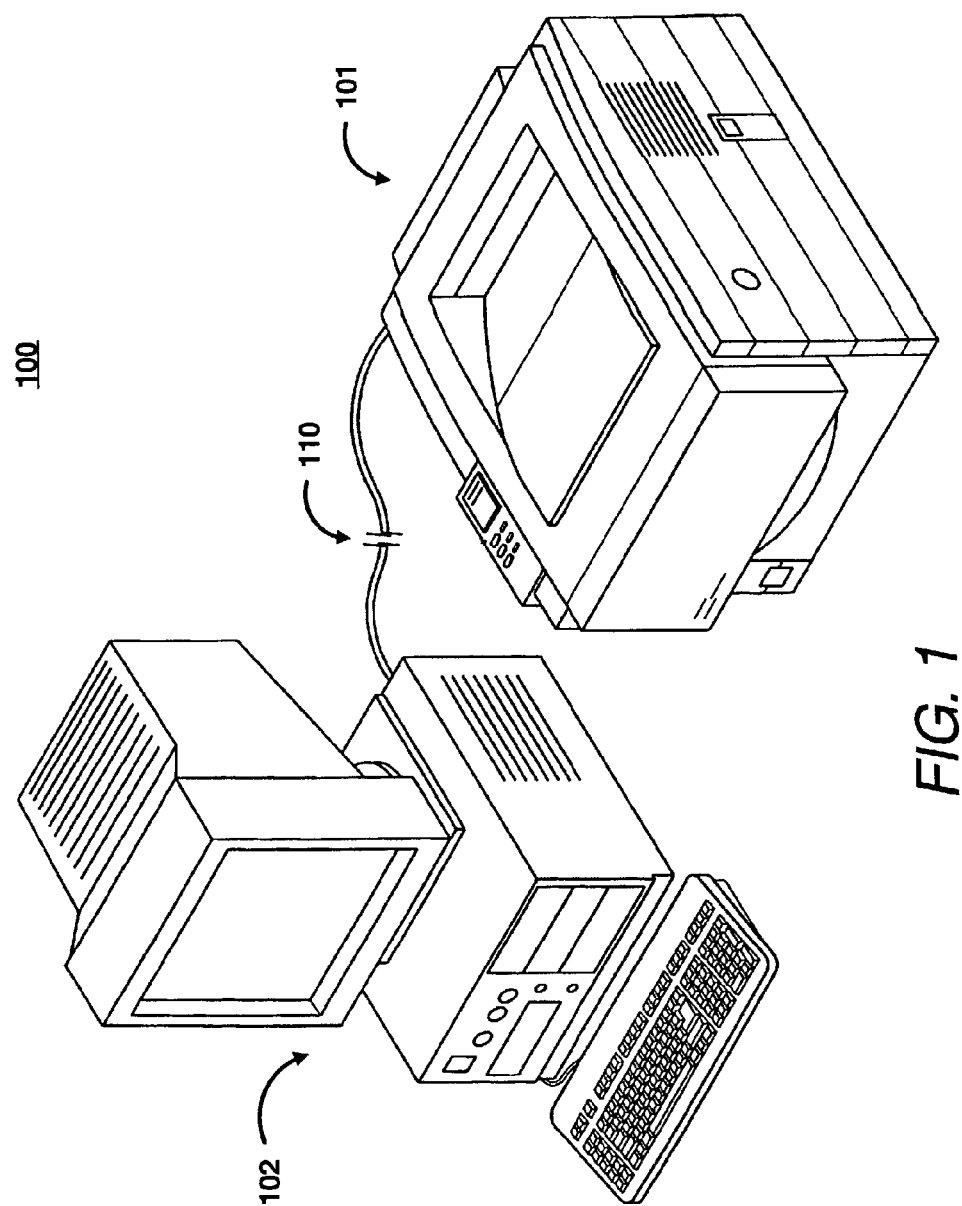
FIG. 1 is a printer and computer system, according to an embodiment of the invention.

FIG. 1 is an exemplary perspective illustration, illustrating a printer and computer system 100, according to a first embodiment of the invention. The system 100 includes a printer 101, which may be a low cost inkjet printer. The invention however, is not limited to inkjet printers as it is equally applicable to any other image forming or printing devices, including laser printers, impact printers, thermal printers, and the like. A personal computer 102 is connected to the printer 101 through a network connection 110. The network connection 110, between the printer 101 and the computer 102 may include a direct connection using a bi-directional parallel port, a universal serial bus (USB), etc. The network connection 110 between the printer 101 and the computer 102 may also include a serial cable, a wireless or remote connection via a telecommunication link, an infrared link, IEEE 1394, radio frequency link etc.

Figure 2:
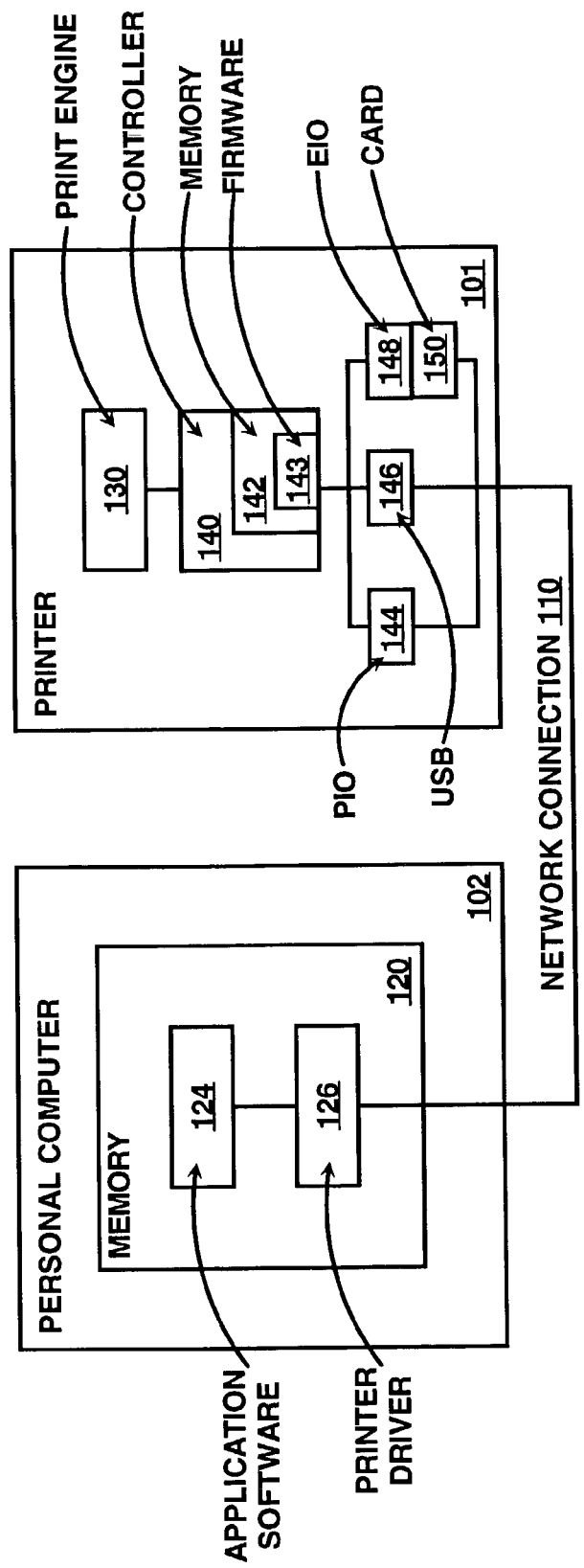
FIG. 2 is an exemplary schematic block diagram of the system of FIG. 1, according to an embodiment of the invention.

FIG. 2 is an exemplary schematic illustration of the system of FIG. 1. As illustrated in FIG. 2, the computer 102 has a memory 120. The memory 120 may be implemented as a combination of volatile and non-volatile memory, such as dynamic random access memory (DRAM), EPROM, flash memory, and the like. The memory 120 may provide storage for document generating application software 124 and an associated printer driver 126. Collectively, the computer 102, the application software 124 and the print driver 126 represent one of various possible source document generators.

As will be better understood later, the source document generator is configured to send a single transmission of one copy of the document accompanied by a command indicating the desired disposition of the document. Therefore, print jobs are transmitted with image data along with data representative of print commands. For example, the transmission of a print job to printer 101 may contain a single collated electronic copy of the document accompanied by printing commands, such as, the number of copies required. Image data includes, but is not limited to text character data, graphics data, and photograph data.

The printer 101 has a print engine 130 connected to a controller 140 that includes processing software for processing print jobs. The processing software may include firmware 143, stored in a local memory 142. The memory 142 may be a random access memory (RAM) or read-only memory (ROM) or a combination of both. The printer 101 may also include one or a combination of, a direct bi-directional parallel input/output (PIO) port or channel 144, a bi-directional USB port or channel 146 and an enhanced input/output (EIO) port or channel 148. In a preferred embodiment, a card 150 is plugged into the EIO port 148, providing communication over the network. The card 150 may be a network card such as a JetDirect card.

In operation, the computer 102, via the network 110, sends a print job to the printer 101. The application software 124 and the print driver 126 generate the print job. The print job includes image data, as well as data representative of print commands. The printer 101 receives the print job from the computer 102. The firmware 143 processes the print job. The firmware 143 includes data, routines and/or executable instructions for converting the image data to raster bits, and for determining and executing print commands associated with the print job, such as the number of copies required.

If the firmware 143 determines that multiple original prints are requested, the converted image data (raster bits) may be sent to the computer 102 for storage. The multiple original prints requested may be multiple copies of multiple-page images. External storage may be utilized when the printer 101 is a low cost printer that does not have an on-board file system, or memory capacity for storing the rasterized files (raster bits). The raster bits may be stored in the computer memory 120, and the printer 101may access the computer memory 120 for printing the multiple original prints.

For example, the host computer 102 may send a job requiring multiple original prints, such as five copies of a three-page job. The firmware 143 coverts the image data into raster bits. Typically, in expensive printers that include on-board file systems, the job would be stored then printed five times in an order as follows: page 1, page 2, and then page 3. However, in less expensive printers that do not carry an on-board file system, mopying is not possible, and the printer may render non-collated prints by separately converting each page into raster bits and then printing five prints of each page in three separate printing processes. The printer may also generate an error and not even attempt to print the job. The printer 101 overcomes these deficiencies by first, recognizing that multiple original prints are required for the print job, and second, by performing the multiple printing tasks according to the printer's limited storage facilities. The firmware 143 recognizes the nature of the print job and performs the printing tasks.

After recognizing that multiple original prints are requested by the print job, the firmware 143 converts pages 1, 2, and 3 into raster bits. Because the printer 101 has no onboard storage for the raster bits of pages 1, 2, and 3, the printer 101 sends each newly rasterized page of the job back to the host computer 102 from which the print job originated for storage. The pages are sent one at a time in sequential order. In one embodiment, the printer 101 "knows" (stores) the location where the rasterized job is stored in the computer 102. During printing, the printer 101 retrieves each page of the entire file, one at a time, and in sequential order. The pages are retrieved from the known location in the computer memory 120, and a collated output is printed, i.e., five copies of prints, properly ordered as page 1, page 2, and page 3.

The print jobs may be transmitted in one or a combination of languages. The firmware 143 in the printer 102 may include interpreters compatible with the various languages. Therefore the firmware 143 may include interpreters of printer job language (PJL), printer control language (PCL), PostScript™, portable document format (PD™) portable document format, and the like.

Figure 3:
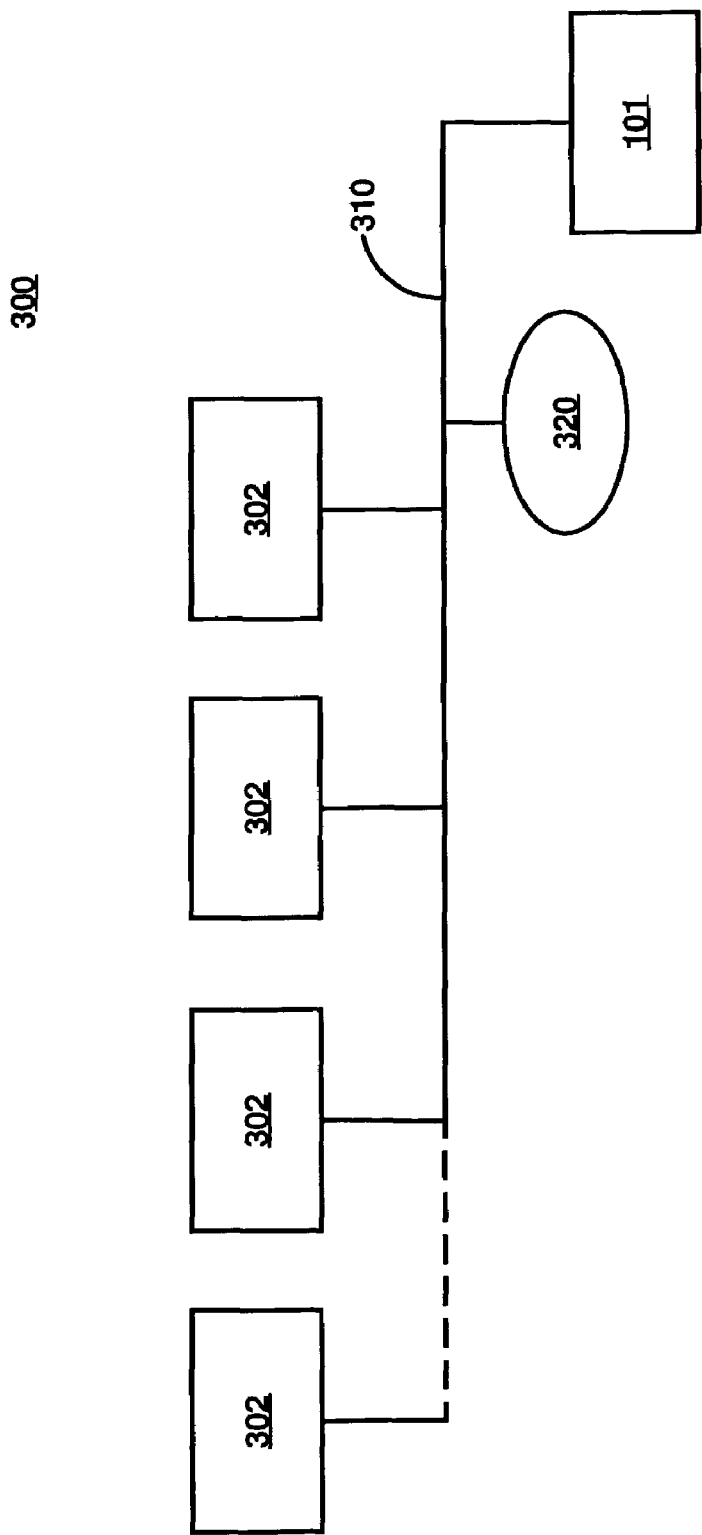
FIG. 3 is an exemplary block diagram of a network printing system, according to an embodiment of the invention.

FIG. 3 is an exemplary schematic illustration of a printer network system 300 according to a second embodiment of the invention. FIG. 3 includes a printer 101, which as outlined above, may be a low cost inkjet printer. However, the invention is not limited to inkjet printers and it is equally applicable to other image forming devices including, laser printers, impact printers, thermal printers and the like. The printer 101 includes all the elements outlined above and illustrated in FIG. 2.

A plurality of host devices 302 are also illustrated. Each host device 302 may be a computer, facsimile machine, digital camera and copier, medical imaging device, optical scanner, satellite imaging device, or any other device that typically requests printing functions. Each host device 302 may include a host memory, application software, and a print driver, as illustrated for the computer 102 in FIG. 2. The printer 101 is connected to the plurality of host devices 302 via a network connection 310. It should be noted that in the printer network system 300, one or more printers and/or one or more host devices may be included.

The printer network system 300 also includes a file storage 320 for storing rasterized print jobs. The file storage 320 may be associated with one of the host devices 302, and may include a memory that is implemented as a combination of volatile and non-volatile memory, such as dynamic random access memory (DRAM), EPROM, flash memory, and the like. The file storage 320 may also be hardware associated with one of the host devices. Alternatively, the file storage 320 may also be independent of the host devices 302, and may be associated with a data communication network, such as the Internet, communicable via an Internet service provider (ISP).

In operation, a print job may be sent by one of the plurality of host devices 302, via the network 310, to the printer 101. The print job is generated in the host by the application software and the print driver, and the print job includes image data, as well as data representative of print commands. The printer 101, by means of firmware 143 (illustrated in FIG. 2), determines the requirements of the print job. The firmware 143 includes data, routines and/or executable instructions for converting the image data into raster bits, and for determining and executing print commands such as the number of copies requested.

According to print job requirements, the printer 101 may convert the image data into raster bits. If the printer 101 determines that multiple original prints are requested, the rasterized file (raster bits) may be sent to the external file storage 320. The multiple original prints requested may be multiple collated and sequential copies. The transmitting of the raster bits to an external file storage 320 may preferably be done when the printer 101 is a low cost printer that typically does not have an on-board file system or memory for storing the raster bits.

In a preferred embodiment, the file storage 320 is associated with the particular host device 302 from which the print job originates. Therefore, when a host device 302 sends a print job to the printer 101, the printer 101 renders image data associated with the print job into raster bits, and sends the rasterized job back to the same host device 302. In this embodiment, the host device 302 preferably transmits the print job with identification data that is representative of the originating network address of the host device 302. The printer 101 recognizes the network address from the identification data. For example, the data may include information such as: hostname\\sharename\subdir1\subdir2, or IP address\\sharename\subdir1\subdir2 for windows, or hostname:/nfs-export/subdir1/subdir2, or IP address:/nfs-export/subdir1/subdir2 for UNIX. The printer 101 sends the rasterized print job to a file storage 320 at the identified location for storage and subsequent printing. In essence, the printer 101 uses the external file storage 320 as a "substitute" on-board filing system, from which the printer 101, for producing the multiple copies of the images, accesses the image file.

The file storage 320 may also be associated with any randomly selected host device 302. Therefore, after rendering the image data associated with the print job into raster bits, the printer 302 may send the rasterized files to a randomly selected file storage 320. The file storage 320 may be manually selected by a user or automatically selected by the printer firmware. During a multiple printing process, the printer 101 may send the rasterized files to the selected network address, which is thereafter used as a "substitute" on-board file system. From this network address, the printer 101, for producing the multiple original prints, accesses the image file.

The file storage 320 may also be associated with a storage device independent of any of the plurality of host devices 302. The file storage 320 may be associated with a data communication network, such as the Internet. Therefore, when a host device 302 sends a print job, the printer firmware converts the image data associated with each print job page into raster bits, and sends the rasterized page as a file to a file storage 320 at a network location that is not physically located in any of the plurality of host devices 302. It is contemplated that each print job page can correspond to a single rasterized file, so that multiple print job pages are associated with multiple rasterized files. Alternatively, multiple print job pages can be associated with one rasterized file.

Figure 4:
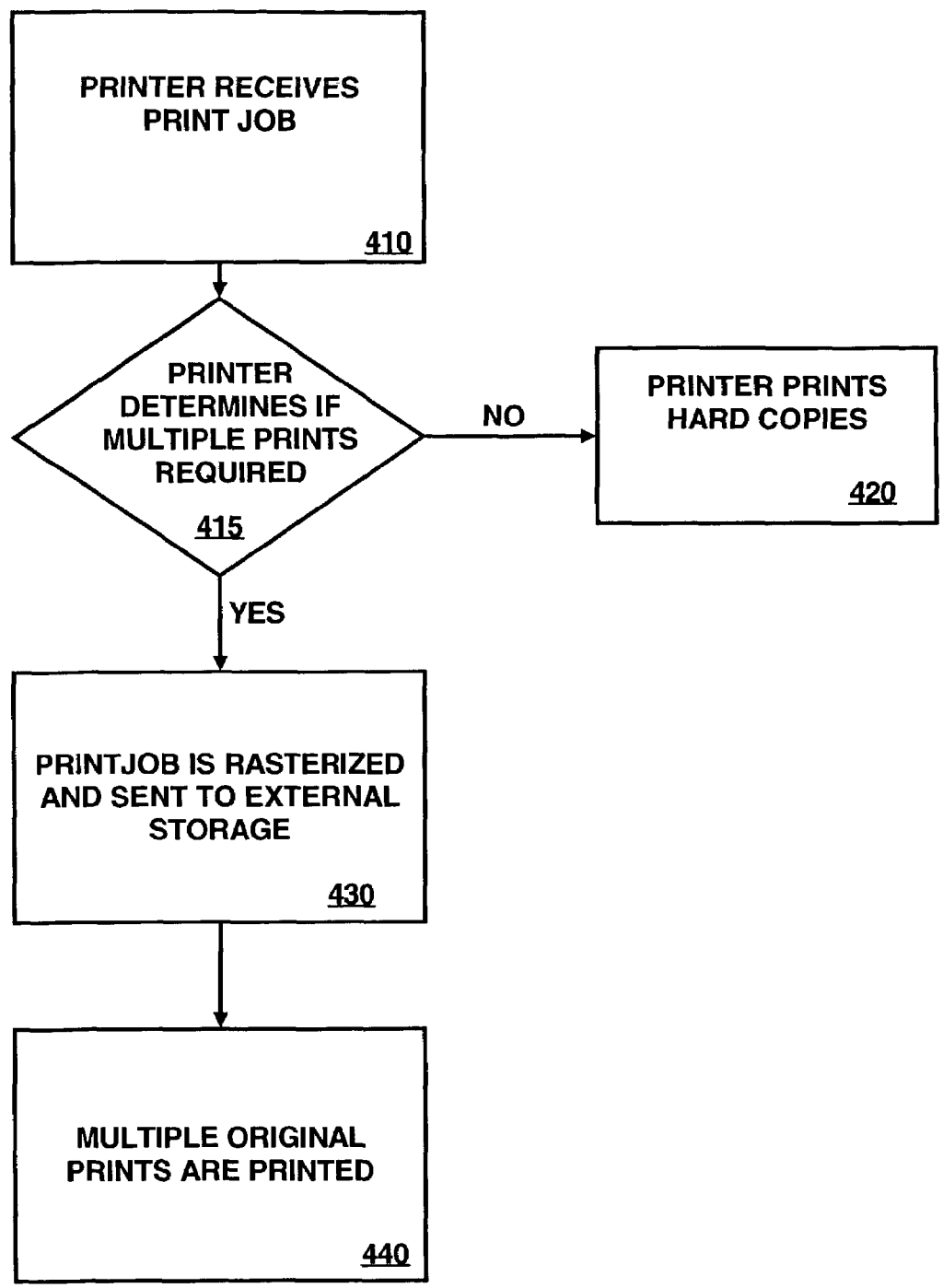
FIG. 4 is a flow diagram illustrating an exemplary method according to an embodiment of the invention.

The flowchart in FIG. 4 illustrates a method 400 of saving images and printing multiple copies of the saved images, according to the embodiments disclosed above. At step 410, the printer 101 receives a print job that is generated by one of the plurality of host devices 302. The transmission is made possible by the network connection 310 between the host devices 302 and the printer 101. The print job includes image data and print command data.

At step 415, the printer controller determines if multiple original prints are required. The multiple original prints may be multiple collated and sequential copies. If the print job does not require multiple original prints, then step 420 is performed. At step 420, the printer 102 prints hardcopies of the requested images.

If, on the other hand, the print job does require multiple prints, then the printer firmware 143 converts image data associated with the print job into raster bits, at step 430. Each page of the job is rasterized a page at a time and stored onto the external file storage 320. The external file storage 320 may be selected automatically or manually. The external file storage 320 may also be associated with any of the plurality of host devices 302. For instance, the external file storage 320 may be located in the host device from which the print job originates. The external file storage 320 may also be located in a host device different from the one from which the print job originates. The external file storage 320 may also be independent of all the host devices.

At step 440, the printer 101 prints the multiple original prints. The printing is executed by accessing the rasterized file located in the external file storage 320. During this process, the printer continuously requests the pages in sequence from the external file storage 320 to allow for proper printing of the pages, e.g., 1, 2, 3, . . . 1, 2, 3, . . . , 1, 2, 3, for each collated set. By doing this, the printer 101 uses the external file storage 320 as a "substitute" on-board file system. For example, the rasterized file is retrieved from the file storage 320 for each corresponding copy that needs to be printed.

It should be noted that this disclosure makes reference to the firmware 143 for conducting various printer, host device, and network related functions. It should be noted, however, that the data, routines and/or executable instructions stored in firmware 143 for enabling the present invention may also be implemented in software or designed into hardware components as is obvious to those of ordinary skill in the art.

It should also be noted that the printer 101 generally refers to printers that include limited storage facilities, in which it is impossible to store an entire rasterized file. However, it is within the scope of this invention, that the printer may have the requisite storage facilities for storing a rasterized file, but may still transmit the rasterized file to a file storage external to the printer. Also, the network printing system 300 may include a plurality of printers as opposed to the one illustrated printer 101.

As evident to one of ordinary skill, the system is also applicable in arrangements that do not involve network connections. One or more host devices may be connected to a printer via a connection that is not a network connection. However typically, when multiple host devices are connected to a printer, a network is used for managing bandwidth.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method of printing comprising:
   receiving at a printing device a print job having image data and a request to print a hard copy of the image data using the printing device;
   converting the image data into raster bits at the printing device, wherein the printing device is incapable of storing all of the raster bits of the print job;
   transmitting the raster bits from the printing device to an external file storage that is responsive to a request from the printing device to retrieve the raster bits from the external file storage to the printing device;
   retrieving the raster bits from the external file storage to the printing device; and
   printing the retrieved raster bits in hard copy form using the printing device.

2. The method of claim 1, further comprising the steps of:
   determining whether multiple original prints are included in the print job; and
   executing the converting and transmitting steps if the multiple original prints are included in the print job.

3. The method of claim 2, wherein each of the multiple original prints includes a plurality of pages having a page order,
   wherein the converting includes converting each of the plurality of pages into a separate grouping of raster bits, and
   wherein, for each of the multiple original prints, each separate grouping of the raster bits is alternately retrieved and printed according to the page order.

4. The method of claim 1, wherein the image data is specified for individual pages, and wherein the converting comprises converting the image data for each of the individual pages into the raster bits, and further wherein the transmitting comprises transmitting the raster bits as rasterized files each corresponding to one of the individual pages.

5. The method of claim 4,
   wherein the retrieving includes retrieving the rasterized files for each of the individual pages from the external file storage to the printing device; and
   wherein the printing includes printing each of the individual pages in hard copy form from the corresponding rasterized file using the printing device.

6. The method of claim 1, further including the step of providing an inkjet printer for receiving the print job, wherein the inkjet printer has a storage system that is unable to store the rasterized file.

7. The method of claim 1, wherein the print job includes multiple pages, and wherein the printing device is incapable of storing the raster bits for all of the multiple pages.

8. A method of printing comprising:
   receiving a print job having image data;
   converting the image data into raster bits;
   selecting an external file storage from memory included in one or more host devices; and
   transmitting the raster bits from a printer to the external file storage, wherein the external file storage is responsive to a subsequent request from the printer to retrieve the raster bits from the external file storage to the printer, and wherein the printer is incapable of storing all the raster bits for the print job.

9. The method of claim 8, wherein the step of selecting the external file storage comprises selecting storage in a memory located in a host device other than a host device from which the print job originated.

10. The method of claim 8, wherein the step of selecting the external file storage comprises selecting storage in a memory located in the host device from which the print job originated.

11. The method of claim 10, further including the step of providing the print job with identification data indicating the host device from which the print job originated.

12. The method of claim 8, wherein the receiving includes receiving the print job at the printer, wherein the converting includes converting the image data by the printer, and wherein the selecting includes the printer selecting the external file storage.

13. The method of claim 8, wherein the print job includes multiple pages of image data, the method further comprising retrieving the raster bits from the external file storage to the printer and printing multiple collated copies of the raster bits.

14. A network printing system comprising:
   a host device of a plurality of host devices, the host device configured to generate a print job, the print job including image data and data representative of print commands, the print command data including a request to print a hard copy of the image data;
   a printer including image processing software for executing the print commands, including converting the image data into a rasterized file, and a print engine for printing the rasterized file in hard copy form, but wherein the printer lacks an internal storage device having sufficient capacity to store the rasterized file for the print job;
   a file storage external to the printer for storing the rasterized file created by the image processing software before the rasterized file is printed; and
   a network connection for transmitting the print job between the printer and the host device and for transmitting the rasterized file between the printer and the file storage.

15. The network printing system of claim 14, wherein the printer includes at least one of a bi-directional input/output port, a bi-directional USB port, or an enhanced input/output port, for connecting the printer to the network connection.

16. The network printing system of claim 14, wherein the external file storage is located in one of the plurality of host devices.

17. The network printing system of claim 14, wherein the external file storage is independent of the plurality of host devices.

18. The network printing system of claim 17, wherein the external file storage is located in a storage device connected to the network printing system through the Internet.

19. A printing system, comprising:
   printing means for receiving a print job including a request to print a hard copy of the image data using the printing means, the printing means including means for rasterizing image data of the print job to produce rasterized image data and means for producing the hard copy of the rasterized image data, the printing means lacking file storage means internal to the printing means that is capable of storing all the rasterized image data for the print job;

external file storage means, external to the printing means, for storing the rasterized image data.

20. The system of claim 19, further comprising:

means external to the printing means for generating the print job; and network means for providing communication between the means for generating the print job, the printing means, and the external file storage means.

21. The system of claim 20, wherein the external file storage means is located in the means for generating the print job.

22. The system of claim 20, wherein the external file storage means is located in a storage device connected to the network means through the Internet.

23. A method of printing multiple prints from a print job, comprising:

receiving a print job at a printing device, the print job including image data specified for individual pages and further including a print command data instructing the printing device to print hard copies of the image data;

determining at the printing device whether multiple prints are requested in the print command data;

converting the image data into raster bits for each of the individual pages at the printing device when multiple prints are requested, wherein the printing device is incapable of internally storing the raster bits for all of the individual pages;

transmitting the raster bits for each of the individual pages from the printing device to an external file storage external to the printing device;

retrieving the raster bits from the external file storage to the printing d device; and printing the retrieved raster bits for each of the individual pages in hard copy form on the printing device.

24. The method of claim 23, wherein the external file storage is responsive to a request from the printing device to retrieve the raster bits from the external file storage to the printing device.

* * * * *

UNITED STATES PATENT AND TRADEMARK OFFICE
CERTIFICATE OF CORRECTION

| | | |
|---|---|---|
| PATENT NO. | : 7,317,550 B2 | Page 1 of 1 |
| APPLICATION NO. | : 10/137395 | |
| DATED | : January 8, 2008 | |
| INVENTOR(S) | : Samuel M. Lester et al. | |

It is certified that error appears in the above-identified patent and that said Letters Patent is hereby corrected as shown below:

In column 10, line 13, in Claim 23, after "printing" delete "d".

Signed and Sealed this

Nineteenth Day of August, 2008

JON W. DUDAS
*Director of the United States Patent and Trademark Office*